United States Patent
Shim et al.

(10) Patent No.: US 11,046,620 B2
(45) Date of Patent: *Jun. 29, 2021

(54) METHOD OF PROCESSING A CERAMIC MATRIX COMPOSITE (CMC) COMPONENT

(71) Applicants: Rolls-Royce Corporation, Indianapolis, IN (US); Rolls-Royce High Temperature Composites, Inc., Cypress, CA (US)

(72) Inventors: Sungbo Shim, Irvine, CA (US); Jun Shi, Carmel, IN (US)

(73) Assignees: ROLLS-ROYCE CORPORATION, Indianapolis, IN (US); ROLLS-ROYCE HIGH TEMPERATURE COMPOSITES INC., Cypress, CA (US)

( * ) Notice: Subject to any disclaimer, the term of this patent is extended or adjusted under 35 U.S.C. 154(b) by 132 days.

This patent is subject to a terminal disclaimer.

(21) Appl. No.: 16/163,771

(22) Filed: Oct. 18, 2018

(65) Prior Publication Data

US 2020/0123068 A1     Apr. 23, 2020

(51) Int. Cl.
*C04B 35/83*     (2006.01)
*C04B 35/565*    (2006.01)
(Continued)

(52) U.S. Cl.
CPC ........ *C04B 35/83* (2013.01); *C04B 2235/422* (2013.01); *C04B 2235/5244* (2013.01);
(Continued)

(58) Field of Classification Search
None
See application file for complete search history.

(56) References Cited

U.S. PATENT DOCUMENTS 3,799,701 A     3/1974 Rothman
5,205,970 A *   4/1993 Brun ............... C04B 35/573
                                                    264/340
(Continued)

OTHER PUBLICATIONS

"Viscosity." Wikipedia, Wikimedia Foundation, Sep. 8, 2018, web.archive.org/web/20180908070935/en.wikipedia.org/wiki/Viscosity. (Year: 2018).*
(Continued)

*Primary Examiner* — Alison L Hindenlang
*Assistant Examiner* — Andrés E. Behrens, Jr.
(74) *Attorney, Agent, or Firm* — Brinks Gilson & Lione (57) ABSTRACT

A method of processing a CMC component includes applying a surface formulation comprising a resin and/or a preceramic polymer to a fiber preform. The surface formulation is cured to form a surface coating, which is then pyrolyzed to convert the resin to carbon and/or the preceramic polymer to silicon carbide. After pyrolysis, the fiber preform is infiltrated with a melt comprising silicon to form a CMC component. During melt infiltration, the carbon reacts with the silicon to form silicon carbide, and the silicon carbide prevents unreacted silicon from accessing a surface region of the CMC component. Thus, after melt infiltration, a concentration of free silicon in the surface region is a low amount of about 5 vol. % or less. Upon assembling the CMC component with a metal component, diffusion between the components is inhibited or prevented by the low amount of free silicon in the surface region.

22 Claims, 4 Drawing Sheets

(51) Int. Cl.
*C04B 35/56* (2006.01)
*F01D 5/00* (2006.01)
*F01D 5/28* (2006.01)

(52) U.S. Cl.
CPC .. *C04B 2235/616* (2013.01); *C04B 2235/963* (2013.01); *F01D 5/282* (2013.01); *F01D 5/284* (2013.01)

(56) References Cited

U.S. PATENT DOCUMENTS

| | | | | |
|---|---|---|---|---|
| 5,246,520 A * | 9/1993 | Scanlon | | B29C 70/504 |
| | | | | 156/245 |
| 5,395,648 A * | 3/1995 | Davis | | C04B 35/803 |
| | | | | 427/192 |
| 5,571,758 A * | 11/1996 | Grossman | | C04B 35/573 |
| | | | | 423/345 |
| 5,990,025 A | 11/1999 | Suyama et al. | | |
| 6,261,981 B1 * | 7/2001 | Dietrich | | C04B 35/806 |
| | | | | 501/95.2 |
| 8,956,105 B2 | 2/2015 | Uskert et al. | | |
| 9,523,149 B2 * | 12/2016 | Lazur | | C04B 35/573 |
| 9,556,750 B2 * | 1/2017 | Freeman | | F01D 5/282 |
| 9,689,265 B2 * | 6/2017 | de Diego | | F01D 5/147 |
| 9,708,226 B2 | 7/2017 | Lazur | | |
| 9,726,025 B2 * | 8/2017 | Lazur | | F01D 5/282 |
| 9,803,486 B2 | 10/2017 | Freeman et al. | | |
| 10,060,272 B2 * | 8/2018 | Jennings | | F01D 5/282 |
| 10,202,860 B2 * | 2/2019 | Hillier | | C04B 35/00 |
| 10,221,700 B2 * | 3/2019 | Meyer | | B32B 15/043 |
| 10,233,126 B2 * | 3/2019 | Harris | | C23C 16/045 |
| 10,253,634 B2 * | 4/2019 | Riley | | F01D 5/189 |
| 2007/0258811 A1 | 11/2007 | Shi et al. | | |
| 2010/0015396 A1 | 1/2010 | Johnson et al. | | |
| 2010/0279845 A1 | 11/2010 | Kebbede et al. | | |
| 2011/0223388 A1 * | 9/2011 | Stone | | B29C 66/83411 |
| | | | | 428/172 |
| 2012/0076927 A1 | 3/2012 | Bhatt et al. | | |
| 2012/0171039 A1 | 7/2012 | Huang et al. | | |
| 2012/0301303 A1 | 11/2012 | Alvanos et al. | | |
| 2013/0167374 A1 | 7/2013 | Kirby et al. | | |
| 2013/0243601 A1 | 9/2013 | Floyd | | |
| 2015/0115489 A1 | 4/2015 | Corman | | |
| 2015/0345388 A1 | 12/2015 | Dimascio et al. | | |
| 2016/0214907 A1 | 7/2016 | Shim et al. | | |
| 2016/0230570 A1 | 8/2016 | Harris et al. | | |
| 2016/0326064 A1 * | 11/2016 | Shim | | F01D 5/284 |
| 2017/0044069 A1 | 2/2017 | Harris | | |
| 2020/0123066 A1 * | 4/2020 | Shi | | C04B 37/023 |
| 2020/0123069 A1 * | 4/2020 | Shim | | C04B 41/009 |

OTHER PUBLICATIONS

Non-Final Office Action, issued in U.S. Appl. No. 16/163,754, dated Apr. 21, 2020, pp. 1-13, U.S. Patent and Trademark Office, Alexandria, VA.

* cited by examiner

FIG. 3C

METHOD OF PROCESSING A CERAMIC MATRIX COMPOSITE (CMC) COMPONENT

TECHNICAL FIELD

The present disclosure is related generally to ceramic matrix composites (CMCs) and more particularly to a method of processing a CMC component.

BACKGROUND

Gas turbine engines include a compressor, combustor and turbine in flow series along a common shaft. Compressed air from the compressor is mixed with fuel in the combustor to generate hot combustion gases that rotate the turbine blades and drive the compressor. Improvements in the thrust and efficiency of gas turbine engines are linked to increasing turbine entry temperatures, which places a heavy burden on turbine blades.

Higher temperature requirements have led to the investigation and use of more heat resistant materials, including ceramic matrix composites (CMCs) in general and silicon carbide (SiC)-based CMCs in particular. Besides high temperature capability, CMCs generally exhibit low densities and low coefficients of thermal expansion. In some instances these CMC components may be employed alongside conventional metal (or metal alloy) components. For example, a metallic spar positioned inside a CMC airfoil, such as a CMC vane, may provide mechanical support and cooling air for the airfoil.

A challenge is avoiding potentially detrimental reactions at high temperatures between metallic elements (e.g., nickel and/or cobalt) in the metal component and unreacted elements (such as silicon) in the CMC component. Unreacted silicon remaining in the CMC component after melt infiltration with silicon or a silicon alloy may be referred to as "free" silicon. At high temperatures, the free silicon present in the CMC component may become highly mobile and diffuse into the metal component, leading to the formation of low melting-temperature phases and/or causing other problems.

BRIEF SUMMARY

A method of processing a CMC component to reduce diffusion at high temperatures when the CMC component is in contact with a metal component is described. The method includes applying a surface formulation comprising a resin and/or a preceramic polymer to a fiber preform. The surface formulation is cured to form a surface coating, which is then pyrolyzed to convert the resin to carbon and/or the preceramic polymer to silicon carbide. After pyrolysis, the fiber preform is infiltrated with a melt comprising silicon to form a CMC component. During melt infiltration, the carbon reacts with the silicon to form silicon carbide, and the silicon carbide prevents unreacted silicon from accessing a surface region of the CMC component. Thus, after melt infiltration, a concentration of free silicon in the surface region is a low amount of about 5 vol. % or less. Upon assembling the CMC component with a metal component, diffusion between the components is inhibited or prevented by the low amount of free silicon in the surface region.

DETAILED DESCRIPTION

A surface modification approach designed to minimize free silicon in a surface region of a CMC component is described.

Consequently, when the CMC component is in contact with a metal component at elevated temperatures, such as during operation in a gas turbine engine, diffusion of free silicon between the components may be minimized.

Figure 1:
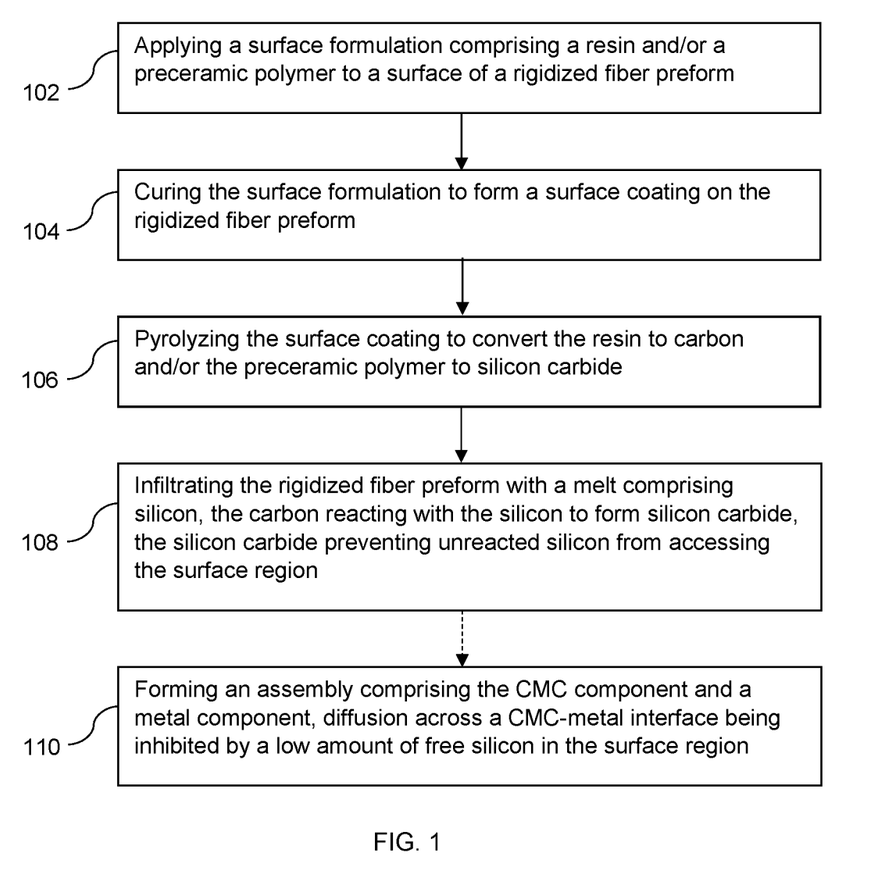
FIG. 1 is a flow chart showing exemplary steps in the method of processing a CMC component.

Referring to the flow chart of FIG. 1, the method includes applying 102 a surface formulation comprising a resin and/or a preceramic polymer to a surface of a fiber preform, preferably a rigidized fiber preform. After application of the surface formulation, a curing step 104 is carried out to immobilize and/or harden the formulation, thereby forming a surface coating on the preform. The surface coating is then pyrolyzed 106 to convert the resin to carbon and/or the preceramic polymer to silicon carbide. After pyrolysis, the fiber preform is infiltrated 108 with a melt comprising silicon to form a CMC component; during infiltration, the carbon reacts with silicon to form silicon carbide, and the silicon carbide prevents unreacted silicon from accessing a surface region of the component. Consequently, a concentration of free silicon in the surface region is a relatively low amount of about 5 vol. % or less, or about 2 vol. % or less. After melt infiltration and cooling, an assembly comprising the CMC component and a metal component can be formed 110, where the surface region of the CMC component is in contact with the metal component. Due to the relatively low amount of free silicon in the surface region, diffusion between the components is inhibited or prevented.

The CMC component may comprise a matrix reinforced with silicon carbide fibers, carbon fibers, alumina fibers, aluminosilicate fibers, and/or other ceramic fibers. The matrix may comprise silicon carbide, silicon nitride, silicon nitrocarbide, and/or other ceramic compounds. Typically, the fibers are silicon carbide fibers and the fiber preform is a silicon carbide fiber preform. A ceramic matrix composite that includes a matrix comprising silicon carbide and fibers comprising silicon carbide may be referred to as a silicon carbide/silicon carbide composite or SiC/SiC composite. As used herein, the term "silicon carbide" may refer broadly to the compound SiC as well as to other silicon-containing carbides.

The surface region referred to above may extend across all or only a portion of one or more surfaces of the CMC component. The surface region may be understood to extend to a depth into the CMC component of no more than about 125 microns, and in some cases no more than about 75 microns, or even shallower depths (e.g., no more than 25 microns). Depths beyond the surface region may be referred to as the "bulk" of the CMC component and may include higher amounts of free silicon relative to the surface region. For some applications, there may be multiple surface regions where free silicon is present at a relatively low amount of about 10 vol. % or less. In this disclosure, descriptions of the "surface region" are understood to apply to any or all of the surface regions of the CMC component.

Returning to the description of the surface modification process, the surface formulation may be applied 102 to the surface of the fiber preform by brushing, dipping, spraying, or another method. The surface formulation may have a viscosity low enough to promote flow over the surface, but high enough to prevent excessive penetration into the fiber preform such that, upon melt infiltration, the surface of the CMC component is selectively modified. Preferably, the viscosity of the surface formulation may lie in a range from about 300 cp to about 1000 cp.

The curing step 104 may be carried out to immobilize and/or harden the formulation, thereby forming a surface coating on the preform. The curing may involve heating the surface formulation to an elevated temperature in a range from 150° C. to about 400° C., or exposing the surface formulation to light or a chemical curing agent. Typically, the curing may take place over a time period of about 1 min to about 60 min.

The surface formulation may include other components as needed (e.g., to control viscosity) in addition to the resin and/or the preceramic polymer. The resin may be a high char-yielding resin, such as a phenolic resin, where char yield may be understood to refer to the percent solids (primarily or exclusively carbon) remaining after pyrolysis. The preceramic polymer may comprise an organosilicon polymer and/or an inorganic silicon polymer. For example, the preceramic polymer may comprise polycarbosilane and/or polysiloxane, each of which may be converted to silicon carbide upon heating to a suitable pyrolysis temperature.

Returning to the flow chart of FIG. 1, the surface coating may be pyrolyzed 106 to convert the resin to carbon and/or the preceramic polymer to silicon carbide. The pyrolysis may be carried out at a temperature in a range from about 850° C. to about 1300° C. in an ambient (e.g., air) or controlled environment (e.g., vacuum or inert gas). Due to the pyrolysis of the surface coating, a surface region of the preform may include a layer of carbon and/or silicon carbide. Upon melt infiltration 108 with silicon or a silicon alloy, the carbon may be converted to silicon carbide, and the silicon carbide may help to prevent any unreacted silicon from accessing the surface region of the CMC component.

The method of processing a CMC component may further comprise other conventional steps in CMC fabrication, such as laying up of plies to form a fiber preform having a predetermined shape, and/or application of a fiber interphase coating such as boron nitride to the fiber preform prior to rigidization. A rigidized fiber preform may be formed by applying a matrix material to the fiber preform during a chemical vapor infiltration (CVI) process. The rigidized fiber preform may be infiltrated with a slurry comprising silicon carbide particles in a liquid carrier into the SiC fiber preform. The slurry may further include reactive elements such as carbon that can react with the molten silicon or silicon alloy during melt infiltration, thereby reducing free silicon in the bulk of the CMC component.

Although the surface modification method may lead to a relatively low amount of free silicon in the surface region (e.g., 10 vol. % or less) of the CMC component, the method may further include additional processing steps that may inhibit diffusion upon forming an assembly with a metal component. Referring to the flow chart of FIG. 2, the method may further include modifying 112 the fiber preform to obtain surface bumps upon melt infiltration and/or extracting 114 free silicon from the surface region of the CMC component to further reduce the concentration of free silicon. These optional additional processing steps are described below.

The extraction 114 may comprise contacting the surface region of the CMC component with a wicking medium including an element reactive with silicon ("a reactive element") at an elevated temperature. The reactive element may be carbon or a refractory metal such as molybdenum, niobium or tungsten, for example. The wicking medium may take the form of a porous material such as a felt or a powder that includes the reactive element. The felt may be fabricated from fibers, such as refractor metal (e.g., tungsten) fibers, carbon fibers, carbon nanotubes, and/or graphite fibers. The powder may comprise particles of any shape, including spherical, irregular, and/or elongated particles. Exemplary powders may comprise carbon black, carbon nanotubes, molybdenum particles, niobium particles, and/or tungsten particles. The CMC component may be partially or fully embedded in the powder to ensure direct contact between the surface region and the powders during extraction. When a felt is employed, the felt may be wrapped around part or all of the CMC component or otherwise secured thereto to ensure direct contact between the surface region and the felt during extraction.

It is preferred that the pore size of the felt is in a range from about 10 microns to about 100 microns, or from about 10 microns to about 50 microns, which may prevent an excessive wicking rate that can lead to undesired porosity in the bulk of the CMC. Similarly, the particle size of the powder may be less than about 100 microns and is typically at least about 10 microns, such as in a range from about 10 microns to about 50 microns, from about 10 microns to about 100 microns.

The extraction may be carried out at a temperature in a range from about 1380° C. to about 1450° C., or from about 1380° C. to about 1430° C. The temperature is selected based on the melting temperature of silicon and its alloys. Silicon liquefies at 1414° C., but alloys of silicon may have reduced melting temperatures (e.g., as low as about 1380° C.); thus, extraction of silicon from a CMC that has been melt-infiltrated with a silicon alloy may occur at a somewhat lower temperature. A CMC component, such as a SiC/SiC CMC component, has a much higher temperature resistance and can withstand the extraction without degradation. A time duration for the extraction is typically from about 5 min to about 20 min. The extraction may be carried out in air or in a controlled environment, such as a vacuum or inert gas atmosphere.

The silicon extraction may result in porosity or roughness within the surface region. While roughness at the surface of the CMC component may be beneficial (e.g., for adhesion of an environmental barrier coating), porosity in the bulk of the CMC is generally undesirable and may detrimentally affect the mechanical properties of the component. Consequently, as mentioned above, it is important to control the extraction rate such that free silicon is removed only from the surface region. In addition to selecting the porosity or particle size of the wicking medium to be within a preferred range, a thin coating of boron nitride (BN) may be applied to the surface of the CMC component prior to extraction. Because the contact angle or wetting angle between boron nitride and silicon is very high, the BN coating may help to reduce the extraction rate and allow for easy removal of the wicking medium after extraction. Typically, the BN coating is applied by spraying to a thickness of about 25 microns or less (e.g., from about 1 micron to about 25 microns).

Also or alternatively, it may be advantageous to modify 112 the morphology of the fiber preform such that, upon melt infiltration, the CMC component includes a number of discrete, raised surface features ("surface bumps") which limit the extent of contact between the CMC component and the metal component. To produce the raised surface features, the fiber preform may undergo the shaping process 112 described below.

Figure 3A:
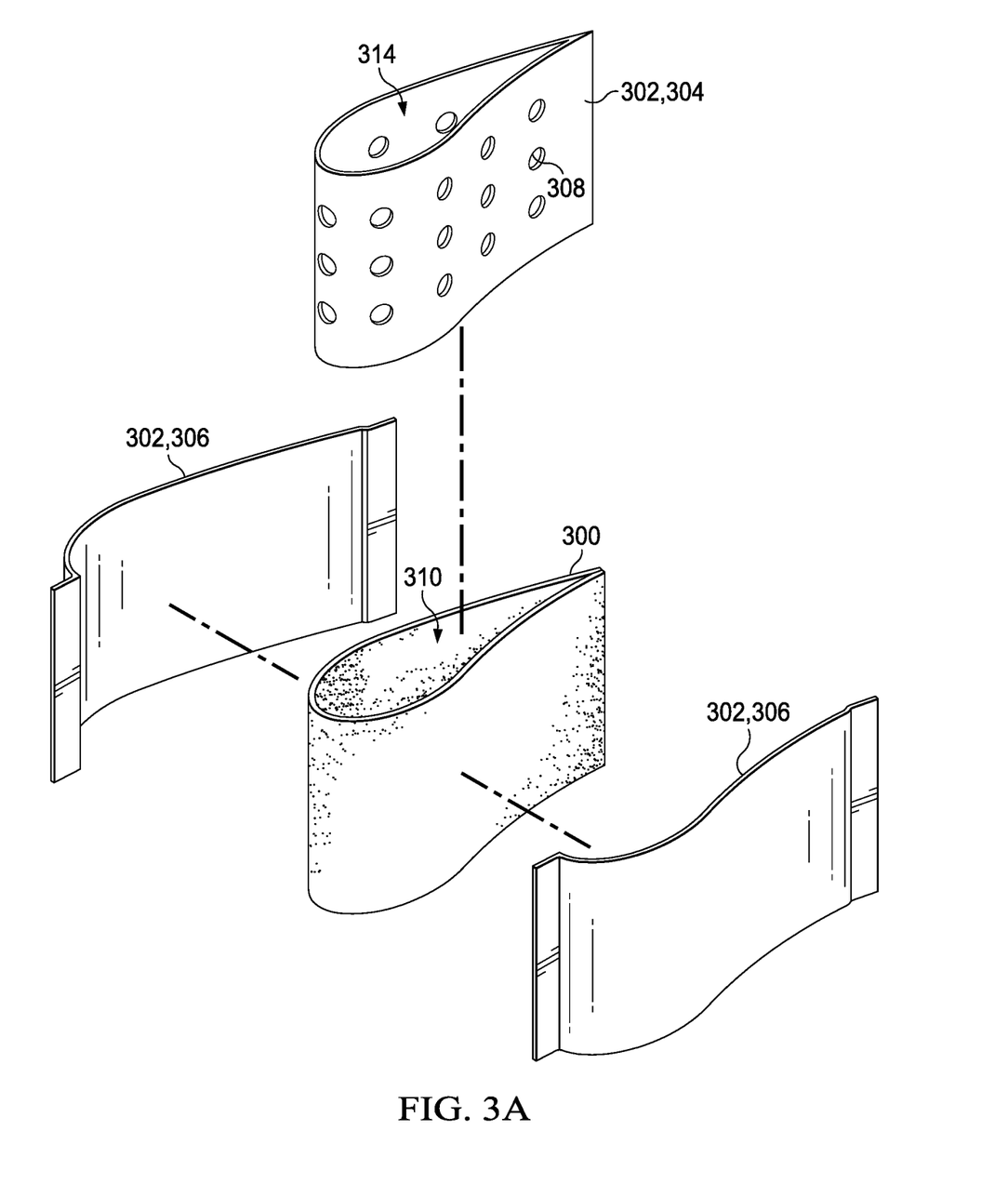
FIGS. 3A-3B show a perspective view of an exemplary fiber preform and internal and external tooling prior to and during a chemical vapor infiltration (CVI) process to form protruded regions on an internal surface of the fiber preform.
Figure 3B:
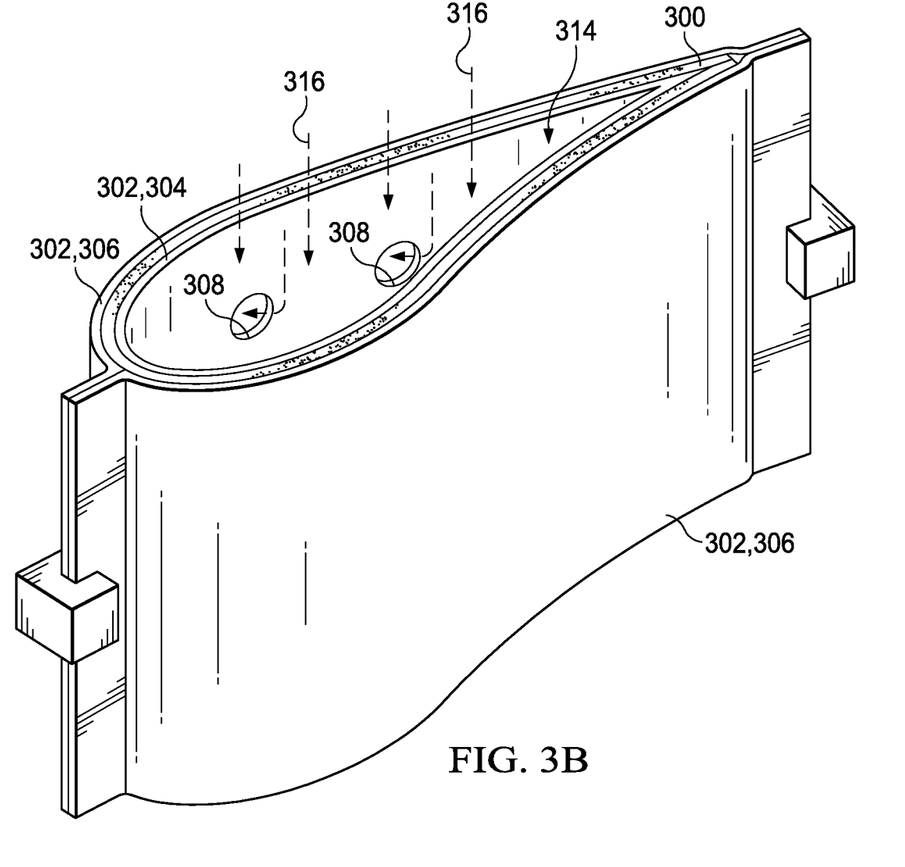
Figure 3C:
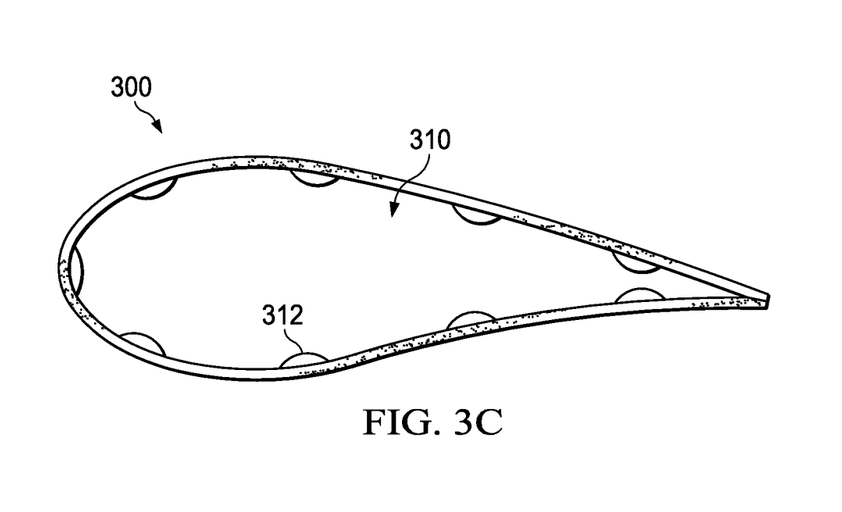
FIG. 3C shows a top view of the fiber preform of FIGS. 3A and 3B after the CVI process, where the protruded regions are visible on the internal surface.

Prior to rigidization using CVI, a fiber preform 300 having a predetermined shape may be positioned with tooling 302 having holes 308 facing one or more surfaces of the fiber preform 300, as shown in FIGS. 3A-3C, which are described in more detail in reference to the example below. In other words, the fiber preform 300 may be placed adjacent to or in contact with the tooling 302, which may serve to hold the shape of the fiber preform 300 during rigidization (e.g., deposition of a matrix material). As would be known by the skilled artisan, the fiber preform 300 is typically formed in a predetermined geometry, such as an airfoil shape, from a stack or arrangement of plies, each comprising a woven or nonwoven arrangement of fibers or fiber tows.

Once the fiber preform 300 and the tooling 302 are properly positioned, a sufficient clamping pressure may be applied to the tooling 302 to force portions of the one or more surfaces of the fiber preform 300 into the holes 308, thereby forming protruded regions of the fiber preform 310. As the clamping pressure is applied, the fiber preform 300 is exposed to gaseous reagents 316 at an elevated temperature, and the matrix material, such as silicon carbide, is deposited on the fiber preform 300. This deposition process may be referred to as CVI. The gaseous reagents 316 may be delivered through the holes 308 in the tooling 302. A rigidized preform 300 including surface protrusions 312 at locations opposite to the holes 308 in the tooling is thus formed.

The tooling 302 may include one or more flow passages 314 in fluid communication with the holes 308 for transport of the gaseous reagents 316 to the fiber preform 300. In the other words, the fiber preform 300 may be exposed to the gaseous reagents 316 by flowing the gaseous reagents 316 through the one or more flow passages 314 and out the holes 308. Due to the high temperatures employed during CVI, the tooling 302 may be fabricated from a material such as graphite.

As would be known to the skilled artisan, the gaseous reagents employed in the process may include a reaction precursor and a carrier gas and may depend on the matrix material to be formed. In one example, where the matrix material includes silicon carbide, the gaseous reagents may include methyltrichlorosilane ($CH_3SiCl_3$; reaction precursor) and hydrogen gas ($H_2$; carrier gas). During the chemical reaction, methyltrichlorosilane may decompose to form solid SiC and gaseous hydrochloric acid (HCl), the former of which is deposited on the fiber preform while the latter is removed by entrainment in the carrier gas. Other gaseous reagents suitable for forming silicon carbide or other matrix materials may also or alternatively be employed.

The holes 308 may be uniformly spaced apart on a surface of the tooling, or they may have an irregular arrangement. Edges of the holes 308 may be rounded or sloped. Typically, the holes 308 have a width or diameter ("size") in a range from about 0.1 in (0.25 cm) to about 0.5 in (1.3 cm). Preferably, the holes 308 have a size larger than a width or diameter of the fiber tows to ensure that portions of the fiber preform 300 can be forced into the holes 308. Also to facilitate formation of the protruded regions 312, the clamping pressure is typically high enough to force portions of the fiber preform 300 into the holes 308, but not so high that individual fibers within the fiber tows are damaged. For example, the clamping pressure may lie in a range from about 10 psi (69 kPa) to about 100 psi (690 kPa), or from about 50 psi (345 kPa) to about 100 psi (690 kPa). There may be additional holes in the tooling intended for delivery of the gaseous reagents that are not relied on for formation of the protruded regions. These additional holes may be smaller in width or diameter than the holes used to form the protruded regions. In other words, the additional holes may be smaller than the width or diameter of the fiber tows.

The size (e.g., width or diameter) of the surface bumps formed on the CMC component may be comparable in size or larger than the holes employed in the tooling. An increased size is possible due to the addition of material to the fiber preform (via CVI and melt infiltration) after the initial formation of the protruded regions. The height of the surface bumps is typically at least about 0.015 in (0.04 cm) and may lie in a range from about 0.005 in (0.01 cm) to about 0.03 in (0.08 cm). The surface bumps may include the matrix material and/or portions of the fibers.

Figure 2:
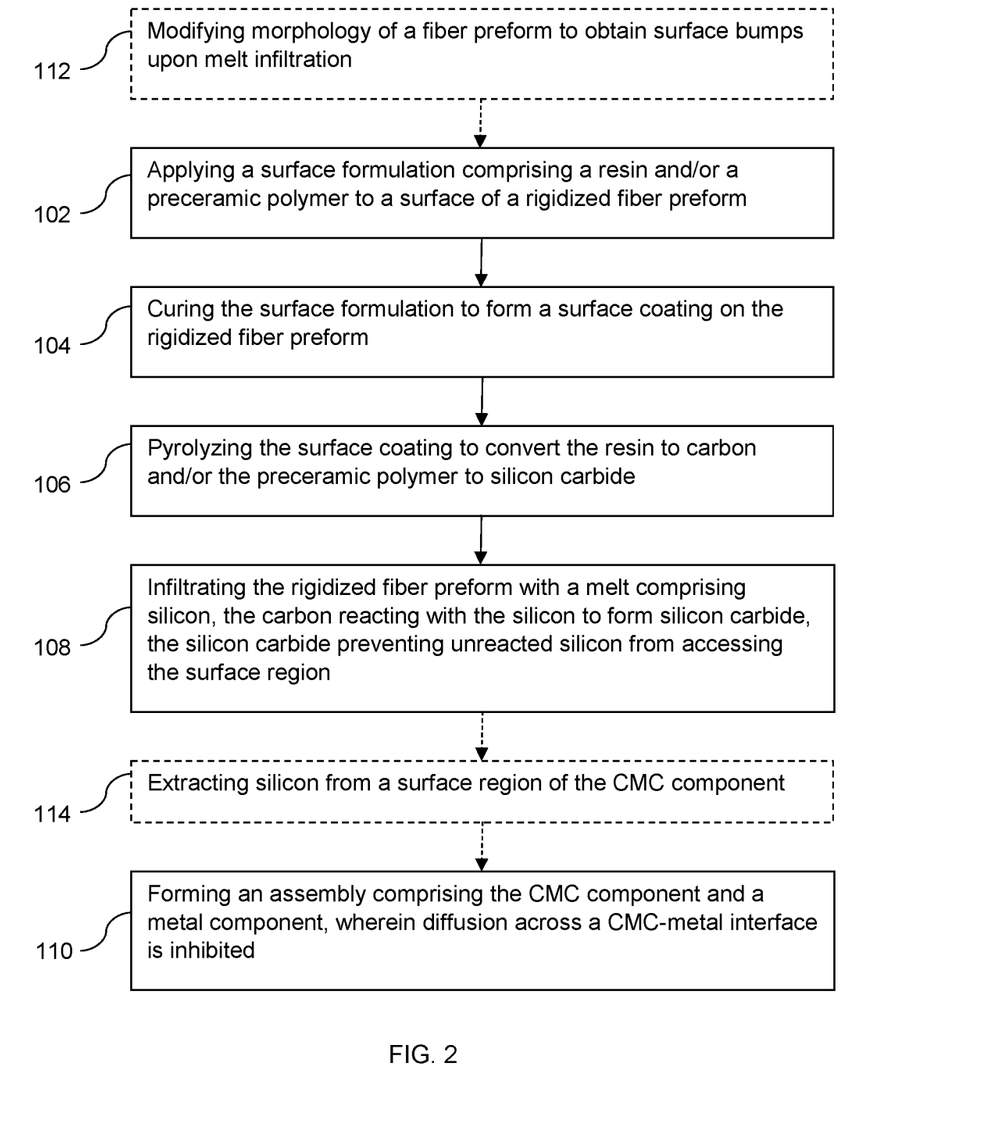
FIG. 2 is a flow chart showing the method of FIG. 1 including additional processing steps.

The tooling is then removed and, ultimately, the rigidized fiber preform may be infiltrated 108 with a melt (e.g., a silicon or silicon alloy melt) for densification, as indicated in the flow chart of FIG. 2. Typically, a slurry infiltration step precedes melt infiltration, as is known in the art, and the surface modification process described above in reference to the flow chart of FIG. 1 is carried out. Thus, a CMC component including surface bumps and/or a reduced amount of free silicon in one or more surface regions may be formed.

Typically, densification to form the final composite is achieved in a melt infiltration step that follows CVI; however, it is possible to achieve densification by depositing a sufficient amount of matrix material during CVI such that a further melt infiltration step is not required. In such a case, the surface protrusions formed as described above via CVI may be understood to be the surface bumps of the CMC component.

Referring again to the flow chart of FIG. 2, after melt infiltration, the CMC component may further undergo the extraction process 114 described above. The surface bumps, when present, may include the surface regions from which silicon is extracted. After extraction, the CMC component may be further formed 110 into an assembly with the metal component, also as described above. The surface bumps on the CMC component may prevent an entirety of the surface of the CMC component from contacting the metal component. The surface bumps may also include a reduced amount of free silicon. Thus, diffusion across a CMC-metal interface, that is, diffusion from the CMC component to the metal component, may be limited.

In one example, the metal component is a metallic spar and the CMC component is a CMC airfoil (e.g., a vane for a gas turbine engine) formed with internal surface bumps. The metallic spar may provide mechanical support to the CMC vane and feed cooling air to an internal surface of the CMC vane. In this case, the predetermined shape of the fiber preform 300 is an airfoil shape, and the fiber preform 300 comprises an internal cavity 310, as shown in FIG. 3A. The tooling 302 includes internal tooling 304 positioned within the internal cavity 310 and external tooling 306 placed external to the fiber preform 300, where the internal tooling 304 comprises holes 308 facing internal surfaces of the fiber preform 300. A clamping force sufficient to force portions of the internal surfaces of the fiber preform 300 into the holes 308 is applied, as illustrated in FIG. 3B, thereby forming internal protruded regions 312 of the fiber preform 300, as shown in FIG. 3C. During the application of the clamping force, the fiber preform 300 is exposed to gaseous reagents 316 at an elevated temperature, and a matrix material is deposited on the fiber preform 300 to form a rigidized preform. The external tooling 306 may include the additional holes mentioned above that are employed for delivery of the gaseous reagents and not relied on for formation of the protruded regions. The internal and external tooling is then removed, and the rigidized preform is infiltrated with melt for densification. Thus, a CMC airfoil including internal surface bumps is formed.

When an assembly is formed from the CMC airfoil and the metallic spar, only the internal surface bumps of the CMC airfoil are in contact with the metallic spar. Thus, diffusion of free silicon from the CMC airfoil to the metallic spar at elevated temperatures (e.g., during operation of a gas turbine engine) may be diminished or avoided altogether. In addition, the internal surface bumps may set the height of a cooling channel between the CMC component and the metal component and allow for transfer of aerodynamic loads.

Another means of minimizing diffusion across the CMC-metal interface may comprise, prior to forming the assembly, depositing an isolation layer or diffusion barrier comprising a material non-reactive with silicon on the metal component. For example, the isolation layer may comprise an aluminide such as CoAl. Any residual silicon in the surface region not removed by above-described approaches may be prevented by the isolation layer from reacting with the metal component during high temperature exposure.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

Although considerable detail with reference to certain embodiments has been described, other embodiments are possible. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages, and it is not necessarily expected that all of the described advantages will be achieved with every embodiment.

The invention claimed is:

1. A method of processing a CMC component, the method comprising:
applying a surface formulation comprising a resin and/or a preceramic polymer to a surface of a fiber preform, the surface formulation having a viscosity in a range from 300 cp to 1000 cp, wherein the viscosity is low enough to promote flow over the surface, but high enough to prevent penetration into the fiber preform;
curing the surface formulation to form a surface coating;
pyrolyzing the surface coating to convert the resin to carbon and/or the preceramic polymer to silicon carbide;
after the pyrolyzing, infiltrating the fiber preform with a melt comprising silicon to form a CMC component, the carbon reacting with the silicon to form silicon carbide, and the silicon carbide preventing unreacted silicon from accessing a surface region of the CMC component;
wherein, after melt infiltration, a concentration of free silicon in the surface region is a low amount of 5 vol. % or less.

2. The method of claim 1, further comprising forming an assembly comprising the CMC component and a metal component, the surface region of the CMC component being in contact with the metal component,
wherein diffusion between the CMC component and the metal component is inhibited or prevented by the low amount of free silicon in the surface region.

3. The method of claim 1, wherein the low amount of free silicon is 2 vol. % or less.

4. The method of claim 1, wherein the fiber preform comprises a rigidized fiber preform.

5. The method of claim 1, wherein the fiber preform comprises silicon carbide fibers, and wherein the CMC component includes a matrix comprising silicon carbide reinforced with the silicon carbide fibers.

6. The method of claim 1, wherein the preceramic polymer comprises an organosilicon polymer and/or an inorganic silicon polymer.

7. The method of claim 1, wherein the resin comprises a phenolic resin.

8. The method of claim 1, wherein the curing comprises heating the surface formulation to a temperature in a range from 150° C. to 400° C.

9. The method of claim 1, wherein the pyrolysis is carried out at a temperature in a range from 850° C. to 1300° C.

10. The method of claim 1, wherein the extraction comprises contacting the surface region of the CMC component with a wicking medium comprising an element reactive with silicon.

11. The method of claim 10, wherein the wicking medium comprises a felt or powder comprising the element reactive with silicon.

12. The method of claim 10, wherein the element reactive with silicon is selected from the group consisting of carbon, molybdenum, and tungsten.

13. The method of claim 10, further comprising, prior to extracting the silicon, depositing a coating comprising boron nitride on the surface of the CMC component.

14. The method of claim 1, further comprising a plurality of the surface regions.

15. The method of claim 1, wherein surface bumps on the CMC component comprise the surface region.

16. The method of claim 15, further comprising forming the CMC component having the surface bumps, the forming comprising:
prior to applying the surface formulation, positioning the fiber preform with tooling having holes facing one or more surfaces of the fiber preform, the fiber preform having a predetermined shape;
after the positioning, applying a clamping pressure to the tooling to force portions of the one or more surfaces of the fiber preform into the holes, thereby forming protruded regions of the fiber preform;
during the application of the clamping pressure, exposing the fiber preform to gaseous reagents at an elevated temperature, thereby depositing a matrix material onto the fiber preform and forming a rigidized preform including surface protrusions opposite to the holes in the tooling; and removing the tooling, wherein, upon infiltration of the fiber preform with the melt for densification, the CMC component is formed with surface bumps.

17. The method of claim 16, wherein the predetermined shape is an airfoil shape, wherein the fiber preform comprises an internal cavity, wherein the tooling includes internal tooling positioned within the cavity and external tooling placed adjacent to an external surface of the fiber preform, the internal tooling comprising the holes, and wherein the CMC component is a CMC airfoil formed with internal surface bumps, and the metal component is a metal spar.

18. The method of claim 17, wherein the tooling includes one or more flow passages in fluid communication with the holes, and wherein exposing the fiber preform to the gaseous reagents comprises flowing the gaseous reagents through the one or more flow passages and out the holes.

19. The method of claim 2, further comprising, prior to forming the assembly, depositing an isolation layer comprising a material non-reactive with silicon on the metal component.

20. A method of processing a CMC component, the method comprising:

positioning a fiber preform with tooling having holes facing one or more surfaces of the fiber preform, the fiber preform comprising silicon carbide fibers and having a predetermined shape;

after the positioning, applying a clamping pressure to the tooling to force portions of the one or more surfaces of the fiber preform into the holes, thereby forming protruded regions of the fiber preform;

during the application of the clamping pressure, exposing the fiber preform to gaseous reagents at an elevated temperature, thereby depositing a matrix material onto the fiber preform and forming a rigidized preform including surface protrusions opposite to the holes in the tooling;

removing the tooling, applying a surface formulation comprising a resin and/or a preceramic polymer to a surface of the rigidized preform including the surface protrusions, wherein a viscosity of the surface formulation is low enough to promote flow over the surface, but high enough to prevent penetration into the rigidized preform;

curing the surface formulation to form a surface coating;

pyrolyzing the surface coating to convert the resin to carbon and/or the preceramic polymer to silicon carbide; and after the pyrolyzing, infiltrating the fiber preform with a melt comprising silicon to form a CMC component, the carbon reacting with the silicon to form silicon carbide, and the silicon carbide preventing unreacted silicon from accessing one or more surface regions of the CMC component, wherein, upon infiltration of the fiber preform with the melt for densification, the CMC component is formed with surface bumps and a concentration of free silicon of 5 vol. % or less in the one or more surface regions, the surface bumps comprising the one or more surface regions.

21. The method of claim 1, wherein the surface formulation is applied by brushing, dipping or spraying.

22. The method of claim 1, further comprising extracting silicon from the surface region of the CMC component after the melt infiltration.

* * * * *